United States Patent [19]

Kish

[11] Patent Number: 5,358,012

[45] Date of Patent: Oct. 25, 1994

[54] HOSE ASSEMBLY HAVING INNER PROTECTIVE VENEER AND BARBED NIPPLE PORTION

[75] Inventor: Arthur S. Kish, Lyndhurst, Ohio

[73] Assignee: JEM Industries, Inc., Willoughby, Ohio

[21] Appl. No.: 33,124

[22] Filed: Mar. 18, 1993

[51] Int. Cl.$^5$ .................. F16L 11/08; F16L 9/16; F16L 55/00

[52] U.S. Cl. .................. 138/109; 138/124; 138/125; 138/137; 138/140; 285/256

[58] Field of Search .............. 138/109, 124, 125, 126, 138/127, 137, 140; 285/256, 259

[56] References Cited

U.S. PATENT DOCUMENTS

| | | | |
|---|---|---|---|
| 1,980,466 | 11/1934 | Angeja | 285/259 |
| 2,816,781 | 12/1957 | Woodling | 285/259 |
| 3,526,416 | 9/1970 | Kish. | |
| 3,530,900 | 9/1970 | Kish. | |
| 3,539,207 | 11/1970 | Harris | 285/256 |
| 3,711,131 | 1/1973 | Evans | 285/259 |
| 4,106,526 | 8/1978 | Szentmihaly | 138/109 |
| 4,114,656 | 9/1978 | Kish. | |
| 4,369,992 | 1/1983 | Fournier et al. | 285/256 |
| 4,657,285 | 4/1987 | Akiyama et al. | 138/109 |
| 4,758,029 | 7/1988 | Davis | 285/259 |
| 4,842,024 | 6/1989 | Palinchak | 138/109 |
| 4,905,736 | 3/1990 | Kitami et al. | 138/137 |
| 5,016,675 | 5/1991 | Igarashi et al. | 138/125 |
| 5,040,830 | 8/1991 | Atkinson | 138/109 |
| 5,044,671 | 9/1991 | Chisnell et al. | 285/256 |
| 5,096,231 | 3/1992 | Chisnell et al. | 285/256 |

FOREIGN PATENT DOCUMENTS

| | | | |
|---|---|---|---|
| 405245 | 1/1991 | European Pat. Off. | 285/256 |
| 1160833 | 8/1958 | France | 285/256 |
| 1402291 | 8/1975 | United Kingdom | 285/256 |
| WO08414 | 6/1991 | World Int. Prop. O. | 285/256 |

*Primary Examiner*—James E. Bryant, III
*Attorney, Agent, or Firm*—Tarolli, Sundheim & Covell

[57] ABSTRACT

A hose assembly is provided having an elongated tubular member having a nipple portion, a hose having an internal diameter corresponding essentially with the outer diameter of said nipple portion and a metallic shell which coaxially surrounds said nipple portion with the hose located therebetween. The shell has a radially inward flange at one end thereof which extends radially into an annular groove located in the tubular portion to prevent axial movement of the shell relative to the nipple portion. The nipple portion has a reduced diameter annular channel having a plurality of axially spaced circumferential barbs which extend radially outward from the channel with the outer diameter of the barbs being less than the outer diameter of the nipple portion. The shell is provided with a plurality of crimps which extend inwardly toward the outer wall of the hose at locations corresponding with the barbs so that the barbs are embedded into the inner wall of the hose by a distance substantially less than the thickness of an inner protective veneer located on the inner wall of the hose.

6 Claims, 3 Drawing Sheets 5,358,012

HOSE ASSEMBLY HAVING INNER PROTECTIVE VENEER AND BARBED NIPPLE PORTION

TECHNICAL FIELD

This invention relates to the art of hose assemblies and, more particularly, to such an assembly employed generally in hydraulic systems, such as automotive air conditioning systems and other industrial applications.

BACKGROUND OF THE INVENTION

Hose assemblies are known in the art and such an assembly typically includes a hose constructed of rubber or similar material, a metal tube having a nipple portion which extends into one end of the hose, and a metallic shell. The shell surrounds a portion of the length of the hose at one end and clamps the hose to the nipple portion. The hose frequently takes the form of an extruded rubber (or synthetic rubber) inner core layer, a reinforcing layer of braided rayon, cotton or nylon or the like, and a covering or sheath of extruded rubber (or synthetic rubber).

Such hose assemblies have frequently been employed in automotive air conditioning systems which have been designed for carrying a refrigerant of the Freon type. More specifically, the refrigerant has included a type known as Freon 12 which does not corrode rubber. But it includes at least one chlorine molecule and is destructive to ozone molecules which may cause some depletion to the earth's ozone layer. To protect the ozone layer, recent legislation has proposed use of a Freon type refrigerant that does not include a chlorine molecule. Recently, a Freon refrigerant known as Freon HFC134a has been proposed. This refrigerant does not have a chlorine molecule and, hence, does not deplete the ozone layer. This refrigerant, however, is corrosive to rubber (including synthetic rubber). Consequently, there is a need to provide a protective layer on the inside surface of the hose to prevent contact between the rubber layer and the refrigerant. It has been determined that a thin protective layer taking the form of a plastic or nylon veneer will serve to provide adequate protection. A problem with such a thin plastic veneer is that it may be scratched by barbs extending radially outward from such a nipple. Depending upon the depth of such scratches, this may provide a location at which the refrigerant may escape and engage with the surrounding rubber layer, causing corrosion thereto. That might eventually lead to sufficient corrosion to result in leakage of the refrigerant to the surrounding atmosphere and thereby cause a breakdown in the proper operation of the associated air conditioning system.

In my U.S. Pat. No. 3,530,900, there is disclosed a hose assembly having barbs extending radially outward from the nipple portion. The barbs are illustrated as having an outer diameter corresponding with that of the outer diameter of the nipple portion and which, in turn, corresponds essentially with the inner diameter of the surrounding hose. If such a nipple were employed with a hose having a protective inner veneer as discussed above, the veneer may be scratched and damaged by the barbs.

In my U.S. Pat. No. 3,526,416 there is disclosed a hose assembly employing a nipple portion and two sets of axially spaced circumferential barbs. A first set is located closer to the free end of the nipple portion than the second set and is intended to be used with a reinforced hose having a plastic or nylon interior layer. The first set of barbs extend radially outward and have an outer diameter substantially greater than the inner diameter of the hose and are embedded into the inner layer thereof. In assembly, a clamp is installed so as to circumferentially surround the hose and provide clamping forces acting radially inward in the area of the first set of barbs. If the nipple portion of a hose assembly as described in my aforesaid U.S. Pat. No. 3,526,416 is employed with the newly proposed hose having an inner protective veneer, the barbs on that nipple portion may scratch and cause severe damage to the veneer which may lead to corrosion of the surrounding rubber layers with the consequent leakage problems as noted above.

In my U.S. Pat. No. 4,114,656, there is disclosed a hose assembly having a nipple which extends into the core of a hose and a loose shell which surrounds the end portion of the hose and the nipple to clamp the hose therebetween. The shell is referred to as a loose shell because it is not welded or otherwise secured to the tube or nipple to prevent relative axial movement therebetween. It is sometimes desired that such an assembly withstand tensile or axial forces and prevent relative axial movement between the nipple and the surrounding shell.

SUMMARY OF THE INVENTION

The present invention contemplates a hose assembly similar to that as discussed above but incorporating features to overcome the noted disadvantages of the prior art and to achieve the objectives noted above and as discussed hereinafter. The invention contemplates, in its various embodiments, the provision of an elongated tubular member having a nipple portion which extends inwardly from one end thereof, a nonmetallic hose which frictionally surrounds the nipple portion and a metallic shell having a generally cylindrical body which coaxially surrounds the nipple portion with the hose located therebetween.

In accordance with one aspect of the invention, the hose has an inner protective veneer and has an inner diameter corresponding to the outer diameter of the nipple portion. The nipple portion has a reduced diameter channel therein which has a plurality of axially spaced circumferential barbs which extend radially out from the channel with the outer diameter of the barbs being less than the outer diameter of the nipple portion. The shell is provided with a plurality of crimps which extend inwardly toward the outer wall of the hose at locations corresponding with the axially spaced barbs so that each barb is embedded into the inner protective layer of the hose.

In accordance with another aspect of the invention, the tubular member has an annular groove extending radially inward at a location spaced inwardly from one end thereof and having an annular radially outward extending shoulder located adjacent the groove and intermediate the groove and the one end. The nipple portion extends from the shoulder to the one end and has an outer diameter less than the outer diameter of the shoulder. The metallic shell has a radially inward flange at one end thereof which extends into the groove preventing axial movement of the shell relative to the nipple portion. The shell is provided with a plurality of crimps which extend inwardly toward the outer wall of the hose at locations corresponding with the axially spaced barbs so that each barb is embedded into the inner wall of the hose.

BRIEF DESCRIPTION OF THE DRAWINGS

The foregoing and other objects and advantages of the present invention will become more readily apparent from the following description as taken in conjunction with the accompanying drawings, wherein.

DESCRIPTION OF THE PREFERRED EMBODIMENTS

Figure 1:
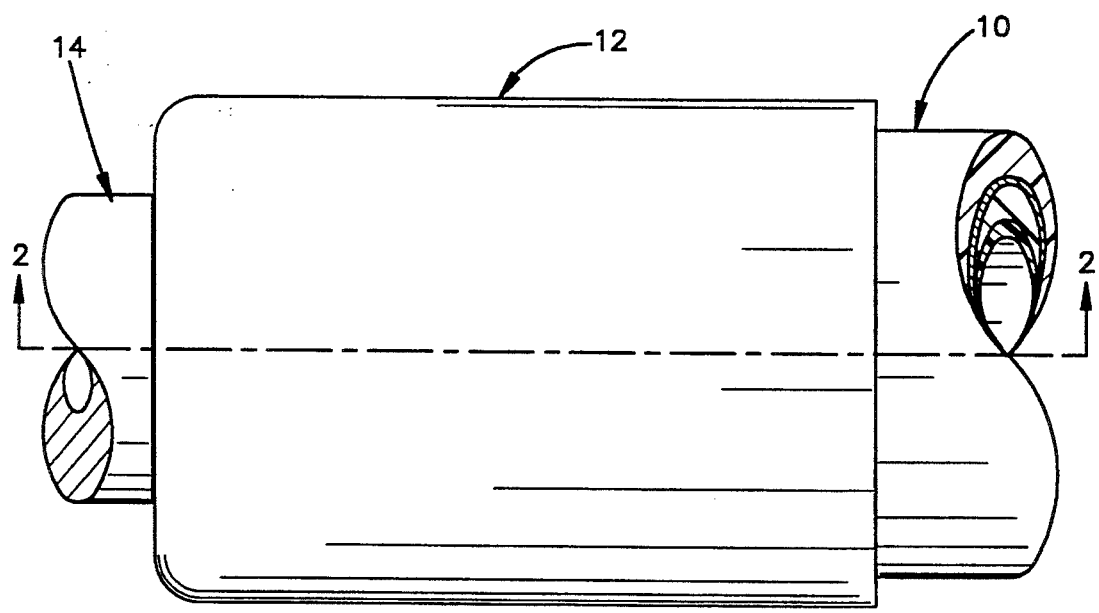
FIG. 1 is a fragmentary plan view showing the components of the hose assembly in assembled relation, prior to crimping the shell.
Figure 2:
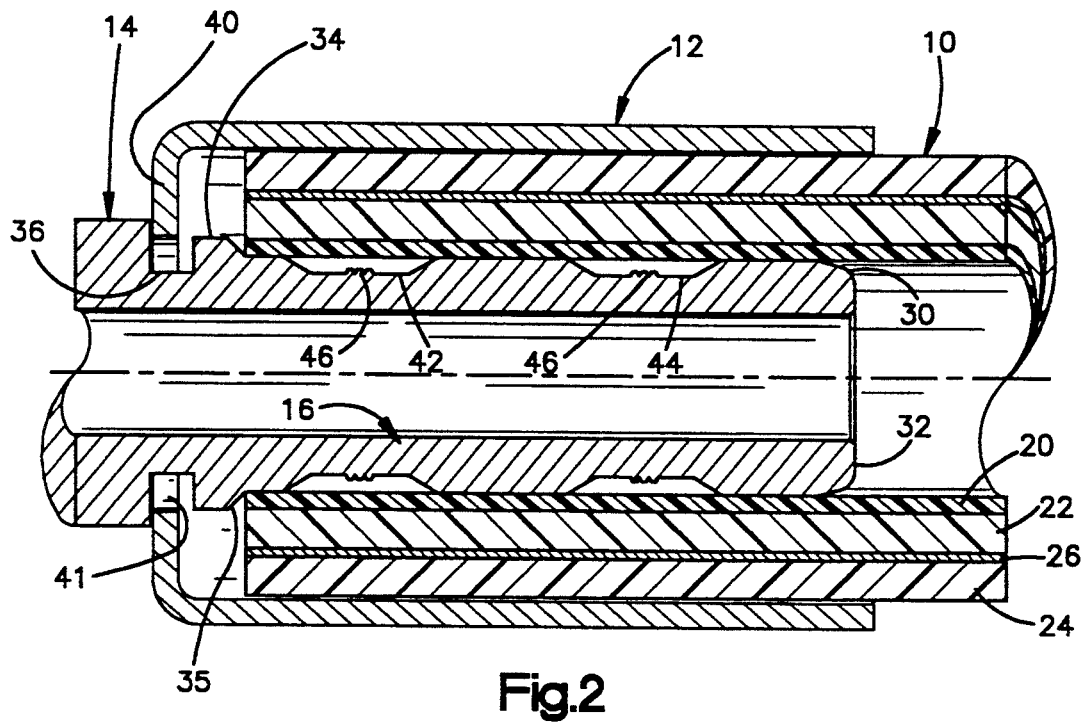
FIG. 2 is a cross sectional view, taken along line 2—2 looking in the direction of the arrows in FIG. 1.

Reference is now made to the drawings wherein the showings are for purposes of illustrating a preferred embodiment of the invention only and not for purposes of limiting same. Referring to FIGS. 1 and 2, there is disclosed a hose assembly including a hose 10, a shell 12 and a tube 14 which includes a nipple 16 (see FIG. 2).

The hose 10 may be constructed of a seamless oil-resistant synthetic rubber designed for minimum penetration through the walls thereof by refrigerants of the type employed in automotive air conditioning systems. More specifically, the hose 10 may take the form of a synthetic rubber reinforced hose having an inner protective veneer 20 constructed of plastic or nylon material so that the hose may be used with such refrigerants as Freon HFC134a which does not have a chlorine molecule and, hence, does not deplete the ozone layer. However, such a refrigerant is corrosive to rubber requiring the nylon veneer 20 for protection. The hose includes an inner layer 22 constructed of synthetic rubber, such as Neoprene or Nitrile. An outer layer 24 may be constructed of a synthetic rubber material such as PVC/Nitrile. These layers are separated by a reinforcing layer constructed of a suitable polyester braid 26. As an example only, the hose may have the following dimensions. The internal diameter of the hose which corresponds with the internal diameter of the protective veneer 20 may be on the order of 0.240±0.015 inches. The veneer 20 may be of a thickness on the order of 0.011 to 0.015 inches. The inner rubber layer 22 may have a thickness on the order of 0.020 inches to 0.028 inches. The polyester braid reinforced layer 26 may have a thickness on the order of 0.028 to 0.032 inches. The outer layer 24 may have a thickness corresponding with that of layer 22. It is to be appreciated that the dimensions given above as well as those to be given later herein with respect to the nipple and the surrounding shell are by way of example only.

The tube including the nipple 16 may be constructed of steel, aluminum or brass tubing, for example. The nipple 16 is intended to be inserted into one end of the hose 10. The nipple 16, as best shown in FIG. 2, includes a portion of the length of the tube 14 at one end thereof. The tube has an outer diameter corresponding essentially with that of the uncompressed or unstressed inner diameter of the hose 10 (and specifically of the inner diameter of the protective veneer 20). To further assist entry of the nipple into the hose, the front end of the nipple is formed to provide an annular cam surface 30.

The nipple 16 extends from its forward end 32 in a rearward direction to an annular shoulder 34 which extends radially outward by a distance greater than the outer diameter of the nipple. Located rearwardly of the shoulder 34, and adjacent thereto, there is provided an annular groove 36 which extends radially inward of the tube 14. As will be discussed hereinafter, this groove 36 serves to receive an inwardly turned flange 40 at one end of the shell 12.

Figure 5:
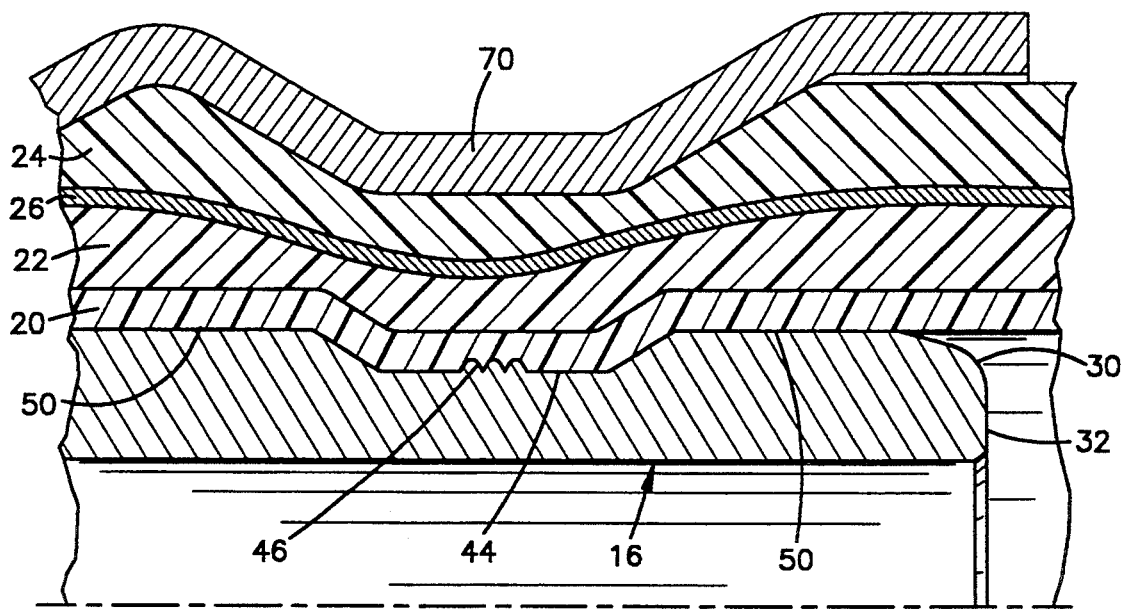
FIG. 5 is an enlarged view showing a portion of FIG. 4.
Figure 6:
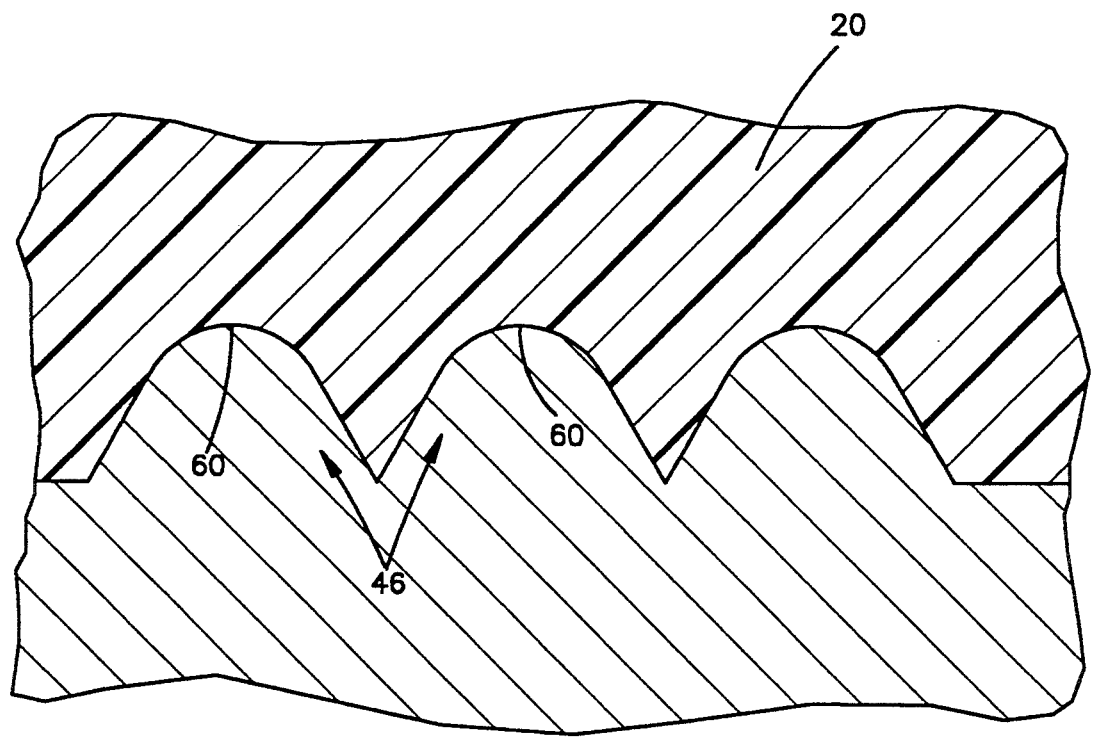
FIG. 6 is an enlarged view showing a portion of that illustrated in FIG. 5.

The nipple 16 is provided with two axially spaced grooves or channels 42 and 44 each having a cylindrical like surface. Each channel has an outer diameter substantially less than the outer diameter of the nipple. Each of these channels is provided with a plurality of axially spaced circumferential barbs 46. These barbs are best seen with respect to groove 44 as illustrated in FIGS. 5 and 6. As shown there, each plurality of barbs 46 includes three axially or longitudinally spaced circumferential barbs which extend radially outward from channel 44 and have an outer diameter less than the outer diameter of surface 50 of the nipple 16. As is best shown in FIG. 6, the barbs 46 are not sharp, but instead are formed with a smooth radius surface 60 with the side walls of each barb having an included angle on the order of 60°. The barbs extend radially outward from channel 44 by a distance which may be on the order of 0.004 to 0.006 inches. The width of each barb as measured from one valley to the next may be on the order of 0.00808 to 0.0104 inches. Consequently, when the hose is compressed in place by crimping the outer shell, to be described hereinafter, the barbs will penetrate into the hose by approximately one-third of the thickness of the nylon veneer 26 (which is on the order of 0.011 to 0.015 inches). The smooth surface 60 of each barb prevents cutting of the protective veneer 20 even when the hose is compressed, as shown in FIGS. 5 and 6.

Figure 3:
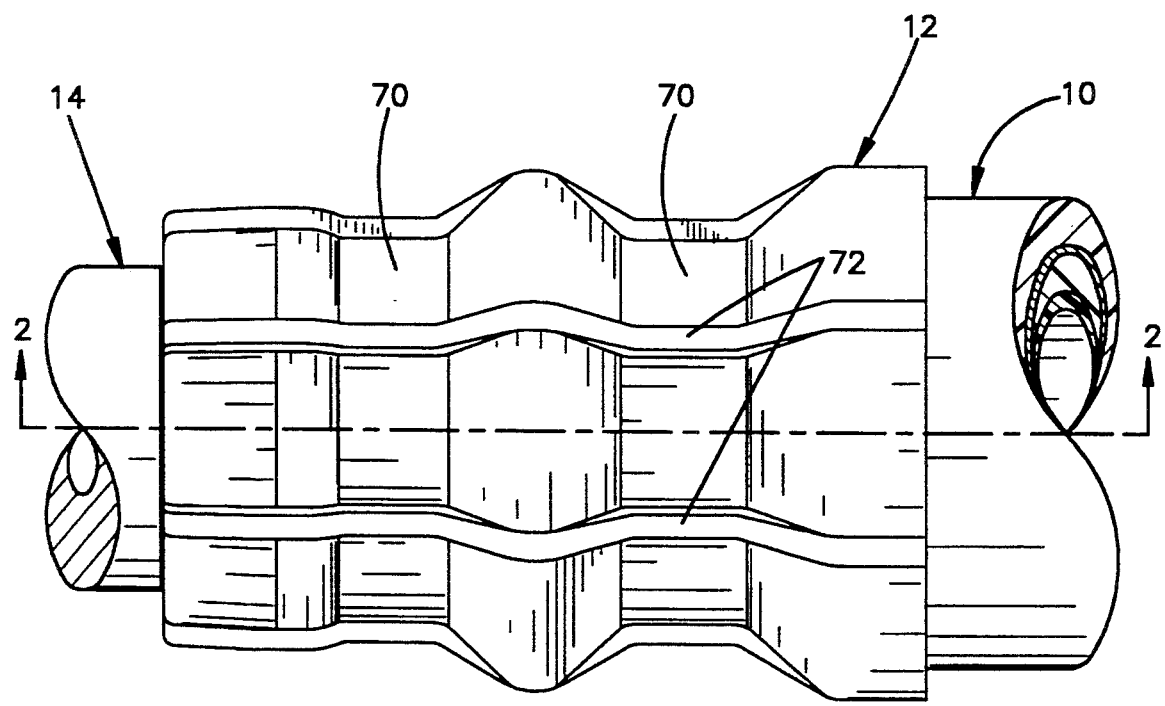
FIG. 3 is view similar to that of FIG. 1, but showing the completed assembly with the shell crimped to the hose and the hose clamped to the nipple.
Figure 4:
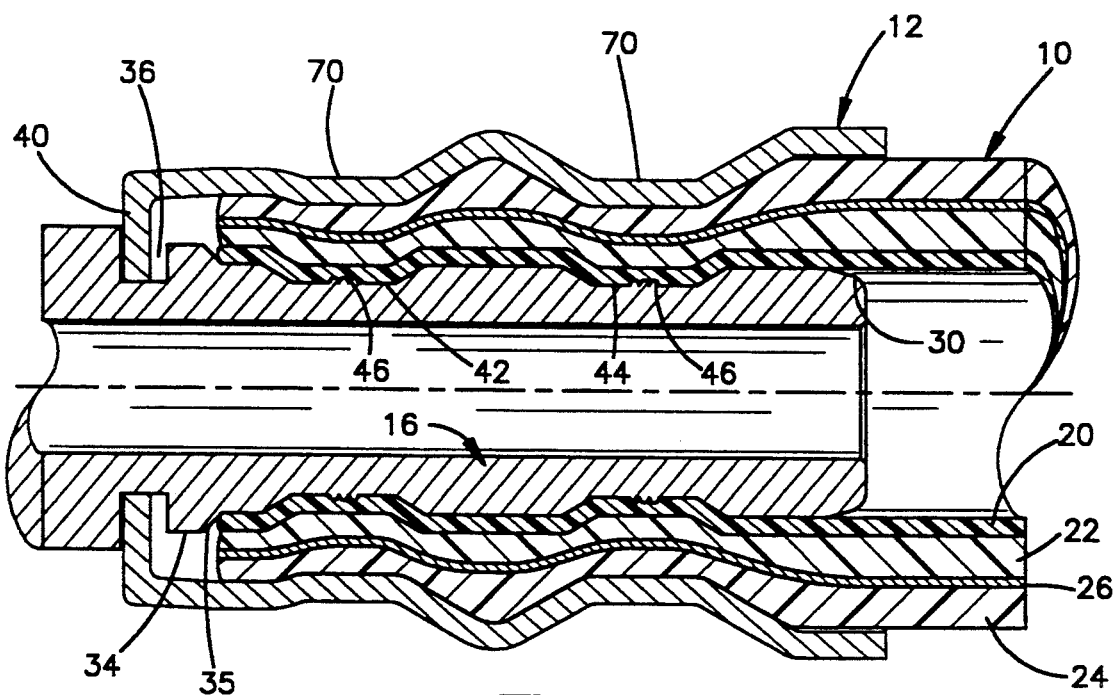
FIG. 4 is a cross sectional view taken along line 4—4 looking in the direction of the arrows in FIG. 3.

During assembly, the shell 12 may be installed on the hose with its inwardly turned flange 40 extending radially toward the floor of the groove 36 in the tube 14. To assist in this installation, the inwardly turned flange 40 is provided with a circular opening 41 of a diameter slightly greater than that of shoulder 34 but less than that of the remaining length of tube 14 so that the shell may be positioned with flange 40 beyond the shoulder 34 as shown in FIG. 2. The hose and the nipple are then moved relative to each other so that the hose extends over the nipple and the relative movement is stopped when the end of the hose engages the annular shoulder 34. The forward side of the shoulder has a cam surface 35 which is angled at approximately 45° so as to serve as a camming or ramp surface as the end of the hose engages the shoulder. At this point, the shell has not been crimped and the inwardly turned flange 40 is spaced somewhat from the floor of the groove 36 and the inner surface of the hose is spaced from barbs 46 in the channels 42 and 44. With the shell and nipple in place as shown in FIG. 2, the assembly is now subjected to a crimping operation to obtain a finished assembly as is shown in FIGS. 3 and 4 to be described below.

The crimping operation may be performed by apparatus such as that disclosed in FIGS. 8 through 14 of my U.S. Pat. No. 3,530,900. That disclosure of a crimping apparatus is herein incorporated by reference. Briefly, the crimping apparatus includes crimping jaws having arcuate crimping elements which are employed for crimping the shell 12 to form circumferentially spaced crimps 70 in the body of the shell 12. The crimping operation is such that there is provided two axially spaced annular arrays of crimps 70 extending radially inward toward the nipple to compress the hose therebetween with the crimps of each annular array being separated by longitudinally extending ribs 72. These crimps 70 are aligned with the barbs 46 in the axially spaced channels 42 and 44 so that a firm frictional grip is obtained between the hose and the shell. This crimping operation causes the barbs 46 which extend radially outward from channels 42 and 44 to become embedded into the inner wall of the protective veneer 20, as is best seen in FIGS. 5 and 6. This provides a good frictional contact or interlock between the hose and the nipple and also provides a tight seal against passage of refrigerant between the hose and the nipple.

The shoulder 34 and its forward cam surface 35 provide a ramp for receiving the free end of the hose during assembly operation. This properly positions the hose relative to the barbs 46 in the grooves 42 and 44 of the nipple for the subsequent crimping operations. In conjunction with the crimping operation, the inwardly turned flange 40 of the shell 12 is crimped or swaged or otherwise displaced inwardly so that the inner edge of the flange engages the floor of groove 36 in the tube 14. This provides a tight fitting assembly preventing the shell 12 and the hose from being axially displaced relative to the nipple during use of the hose for conveying refrigerant.

Although the invention has been described in conjunction with a preferred embodiment, it is to be appreciated that various modifications may be made without departing from the spirit and scope of the invention as defined by the appended claims.

Having described the invention, the following is claimed:

1. A hose assembly comprising:
   an elongated tubular member having a nipple portion extending inwardly for a portion of the length thereof from one end of said member.
   a non-metallic hose having a free end, said hose frictionally surrounding and receiving said nipple portion, said hose having an inner protective veneer and said hose having an inner diameter corresponding with the outer diameter of said nipple portion;
   said nipple portion having at least one reduced diameter annular channel therein and having a plurality of axially spaced circumferential barbs which extend radially outward from said channel with the outer diameter of said barbs being less than the outer diameter of said nipple portion;
   a metallic shell having a generally cylindrical body coaxially surrounding said nipple portion with said hose located therebetween, said shell being provided with a plurality of crimps which extend inwardly toward the outer wall of said hose at locations corresponding with said axially spaced barbs so as to compress said hose therebetween and so said barbs are embedded into said inner protective veneer of said hose;
   said barbs extend radially outward from said channel by a distance substantially less than the thickness of said veneer so that each said barb is embedded into said inner protective veneer by a distance substantially less than the thickness of said veneer; and
   said barbs include barbs which are axially spaced from each other with axially adjacent said barbs being spaced from each other by a distance approximately equal to the extent that each said barb extends radially outward from said channel.

2. A hose assembly as set forth in claim 1 wherein said hose includes inner and outer layers of extruded rubber and having an intermediate reinforcing layer therebetween and wherein said veneer is located on the inner surface of said inner rubber layer and being of a thickness substantially less than that of said inner or outer rubber layers.

3. A hose assembly as set forth in claim 2 wherein said tubular member has a radially outward extending shoulder located inwardly from said one end of said nipple portion with said shoulder having an outer diameter greater than that of said nipple portion and serving as a stop to prevent movement of the free end of said hose beyond said shoulder portion.

4. A hose assembly as set forth in claim 3 wherein said tubular member has an annular groove extending radially inward of said member at a location spaced inwardly from said shoulder, said shell having a radially inward flange at one end thereof and extending radially into said groove for preventing axial movement of said sleeve relative to said nipple portion.

5. A hose assembly comprising:
   an elongated tubular member having a nipple portion extending for a portion for the length extending inwardly from one end thereof;
   said tubular member having an annular groove extending radially inward of said member at a location spaced inwardly from said one end, said tubular member having an annular radially Outward extending shoulder located adjacent said groove and intermediate said groove and said one end;
   said nipple portion extending between said shoulder and said one end and having an outer diameter less than that of the outer diameter of said shoulder;
   a non-metallic hose having a free end and which frictionally surrounds and receives said nipple portion with said free end against said shoulder;
   a metallic shell having a generally cylindrical body coaxially surrounding said nipple portion with said hose located therebetween, said shell having a radially inward flange at one end thereof extending radially into said groove preventing axial movement of said shell relative to said nipple portion;
   said nipple portion having a plurality of axially spaced barbs extending radially outward from said nipple portion toward the inner wall of said hose;
   said shell being provided with a plurality of crimps which extend inwardly toward the outer wall of said hose at locations corresponding with said axially spaced barbs for compressing the hose therebetween so that said barbs are embedded into the inner wall of said hose;
   said hose has an inner protective veneer and having an internal diameter corresponding with the outer diameter of said nipple portion;
   said barbs have an outer diameter less than the internal diameter of the hose prior to compression thereof by said crimps;.
   said nipple portion has at least one reduced diameter annular channel therein and wherein said barbs include a plurality of axially spaced circumferential barbs which extend radially outward from said channel with the outer diameter of said barbs being less than the outer diameter of said nipple portion;

said hose includes inner and outer layers of extruded rubber having an intermediate reinforcing layer therebetween and wherein said veneer is of a thickness substantially less than that of said inner or outer rubber layers;

said barbs are arranged such that axially adjacent barbs are spaced from each other by a distance approximately equal to the extent that each barb extends radially outward from said channel.

6. A hose assembly comprising:

an elongated tubular member having a nipple portion extending for a portion of the length extending inwardly from one end thereof;

said tubular member having an annular groove extending radially inward of said member at a location spaced inwardly from said one end, said tubular member having an annular radially outward extending shoulder located adjacent said groove and intermediate said groove and said one end;

said nipple portion extending between said shoulder and said one end and having an outer diameter less than that of the outer diameter of said shoulder;

a non-metallic hose having a free end and which frictionally surrounds and receives said nipple portion with said free end against said shoulder, said hose having an inner protective veneer and having an inner diameter corresponding with the outer diameter of said nipple portion;

a metallic shell having a generally cylindrical body coaxially surrounding said nipple portion with said hose located therebetween, said shell having a radially inward flange at one end thereof extending radially into said groove preventing axial movement of said sleeve relative to said nipple portion;

said nipple portion having at least one reduced diameter annular channel therein and having an plurality of axially spaced circumferential barbs which extend radially outward from said channel With the outer diameter of said barbs being less than the outer diameter of said nipple portion;

said shell being provided with a plurality of crimps which extend inwardly toward the outer wall of said hose at locations corresponding with said axially spaced barbs compressing said hose therebetween such that said barbs are embedded into the inner wall of said hose;

said veneer is of a thickness substantially greater than the height of each said barb so that said barbs are embedded in said veneer by a distance substantially less than the thickness of said veneer;

said hose includes inner and outer layers of extruded rubber and having an intermediate reinforcing layer therebetween and wherein said veneer is of a thickness substantially less than that of said inner or outer rubber layers; and said barbs are arranged such that adjacent axially spaced barbs are axially spaced from each other by a distance approximately equal to the extent that each barb extends radially outward from said groove.

* * * * *